United States Patent [19]

Lipp

[11] E Re. 30,015

[45] Reissued May 29, 1979

[54] IMAGE DISPLAY EMPLOYING FILTER COATED PHOSPHOR PARTICLES

[75] Inventor: Steven A. Lipp, Hopewell, N.J.

[73] Assignee: RCA Corporation, New York, N.Y.

[21] Appl. No.: 670,853

[22] Filed: Mar. 26, 1976

Related U.S. Patent Documents

Reissue of:

[64] Patent No.: 3,886,394
Issued: May 27, 1975
Appl. No.: 394,094
Filed: Sep. 4, 1973

[51] Int. Cl.[2] ..... H01J 29/18

[52] U.S. Cl. ..... 313/470; 313/473; 313/474

[58] Field of Search ..... 313/474, 473, 466

[56] References Cited

U.S. PATENT DOCUMENTS

| | | | |
|---|---|---|---|
| 2,536,764 | 1/1951 | Moulton | 350/164 |
| 3,043,196 | 7/1962 | Palmquist et al. | 117/27 |
| 3,114,065 | 12/1963 | Kaplan | 313/472 |
| 3,231,775 | 1/1966 | Pritchard | 313/473 |
| 3,275,466 | 9/1966 | Kell | 313/92 PF |
| 3,308,326 | 3/1967 | Kaplan | 313/474 |
| 3,330,981 | 7/1967 | Aia | 313/92 |
| 3,544,354 | 12/1970 | Kachel | 313/474 |
| 3,714,490 | 1/1973 | Kell | 313/473 |
| 3,875,449 | 4/1975 | Byler et al. | 313/473 X |

FOREIGN PATENT DOCUMENTS

| | | | |
|---|---|---|---|
| 744776 | 2/1956 | United Kingdom | 313/466 |

*Primary Examiner*—Robert Segal
*Attorney, Agent, or Firm*—G. H. Bruestle; L. Greenspan

[57] ABSTRACT

An image display comprising a viewing screen including a layer of phosphor particles emissive of light of a particular visual color and color filter particles transmissive of light of that color *partially* covering [between 20 and 80 percent of] the surfaces of the phosphor particles.

2 Claims, 5 Drawing Figures

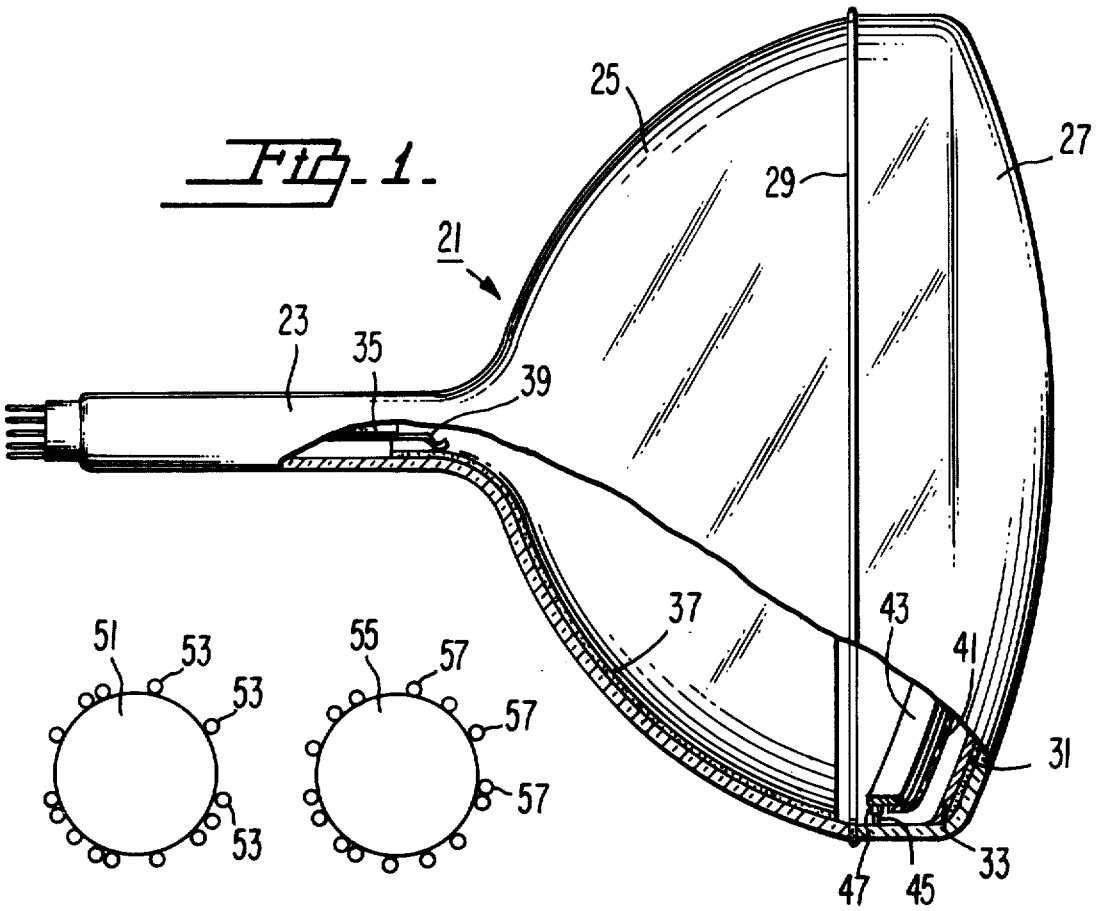
Fig. 1.
Fig. 3.
Fig. 4.
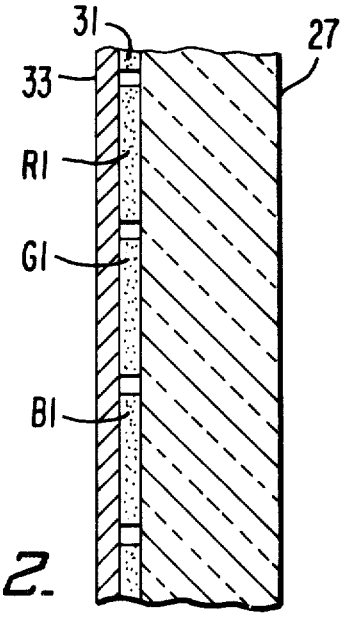
Fig. 2.
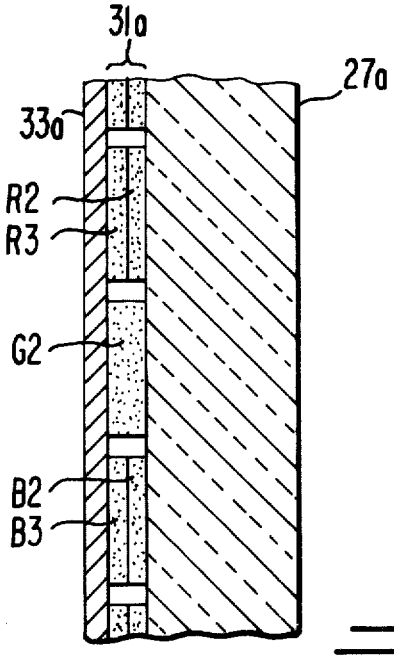
Fig. 5.

IMAGE DISPLAY EMPLOYING FILTER COATED PHOSPHOR PARTICLES

Matter enclosed in heavy brackets [ ] appears in the original patent but forms no part of this reissue specification; matter printed in italics indicates the additions made by reissue.

BACKGROUND AND SUMMARY OF THE INVENTION

In U.S. Pat. No. 3,308,326 to S. H. Kaplan, there is disclosed a color television picture tube including a viewing screen comprised of three interlaced patterns of target elements. One pattern is red emitting, one pattern is green emitting, and one pattern is blue emitting. In order to improve the image contrast of the screen for viewing in relatively bright ambients, that patent suggests placing a red-transmitting color filter in front of the red-emitting elements, either as a separate layer in front of the red-emitting elements, or as a thin overcoating or layer surrounding each red-emitting phosphor particle. It has been found that practical filter layers which surround the phosphor particles absorb too much of the light emitted from the phosphor particles, with the result that the displayed image is not as bright as it could be.

The novel image display, which may be a color television picture tube, comprises a luminescent viewing screen including a layer of phosphor particles and color filter particles adhered to the surfaces of the phosphor particles and *partially* covering [between 20 and 80 percent of] the surfaces of those phosphor particles. The phosphor particles are emissive of light in a particular portion of the visible spectrum, and the color filter particles are transmissive of light in those portions of the spectrum and absorptive of light in other portions of the visible spectrum. By only partially covering the phosphor particles with filter particles, the transmission, absorption, and reflection of light from different portions of the visible spectrum may be tailored to optimize the brightness and contrast of the displayed image in relatively bright ambients.

The invention may be applied to monocolor and multicolor displays. In multicolor displays, the filter particles may be applied to the phosphor particles in one or more of the constituent color elements of the display. In one form of the invention, the layer of filter-particle-coated phosphor particles may be backed up with a layer of phosphor particles having no filter particle coating thereon.

BRIEF DESCRIPTION OF THE DRAWINGS

FIG. 1 is a partially broken away longitudinal view of a novel cathode-ray tube of the invention.

FIG. 2 is an enlarged fragment of the viewing screen of the tube shown in FIG. 1.

FIG. 3 is an idealized sectional view of a red-emitting phosphor particle employed in the viewing screen of the tube in FIG. 1.

FIG. 4 is an idealized sectional view of a blue-emitting phosphor particle employed in the viewing screen of the tube of FIG. 1.

FIG. 5 is an enlarged fragment of a viewing screen which may be substituted in the tube shown in FIG. 1.

DESCRIPTION OF THE PREFERRED EMBODIMENT

The cathode-ray tube illustrated in FIG. 1 is an aperture mask type kinescope. The tube includes an evacuated envelope designated generally by the numeral 21, which includes a neck 23 integral with a funnel 25, and a faceplate or panel 27 joined to the funnel 25 by a seal 29, preferably of devitrified glass. There is a luminescent layer 31 comprised of phosphor material on the interior surface of the faceplate 27. The construction of the luminescent layer 31 is considered in more detail below in connection with FIGS. 2, 3 and 4. There is a light-reflecting metal coating 33, as of aluminum, on the luminescent layer 31. The luminescent layer 31, when suitably scanned by three electron beams from a gun in a mount assembly 35 located in the neck 23, is capable of producing a luminescent image in color, which may be viewed through the faceplate 27. The luminescent layer 31, the light-reflecting metal coating 33, and any associated structure constitute the viewing screen of the tube.

There is an electrically-conducting internal coating 37 on a portion of the interior surface of the funnel 25 between the mount assembly 35 and the seal 29. Three metal fingers 39 space the mount assembly 35 from the neck wall and connect the forward portion of the mount assembly 35 with the internal coating 37. Closely spaced from the metal coating 33 toward the mount assembly 35 is a metal mask 41 having a multiplicity of apertures therein. The mask 41 is welded to a metal frame 43 which is supported by springs 47, which are attached to the frame 43, on studs 45 sealed in the wall of the panel 27. Except for the details of the luminescent layer 31, the tube is conventional in construction and operation, so that a detailed description thereof is not necessary at this time.

FIG. 2 shows that the viewing screen of the tube of FIG. 1 includes the luminescent layer 31 comprised of separate red-emitting target elements R1, separate green-emitting target elements G1 and separate blue-emitting target elements B1, on the inner surface of the panel 27 and overlaid by the reflecting layer 33. The target elements are generally circular in shape and are arranged on the inner surface of the panel 27 in a hexagonal array of three interlaced patterns, one of each emission color. Each aperture in the mask 41 is associated with three target elements, called a trio, one of each emission color. The viewing screen may be similar to the screen described in U.S. Pat. No. 3,423,621 to M. R. Royce, except for the presence of filter particles on the red-emitting and blue-emitting phosphor particles.

The red-emitting target elements R1 consist principally of red-emitting phosphor particles 51 of europium-activated yttrium oxysulfide partially coated with red-transmitting filter particles 53, as shown in FIG. 3. The phosphor particles 51 [are about 8 to 12 microns average size and] have adhered to their surfaces red-transmitting filter particles 53 of cadmium sulfoselenide which are about 0.1 to 0.5 microns average size. [On the average, about 40 percent of the] *The* surfaces of the phosphor particles 51 are *only partially* covered with filter particles 53.

The blue-emitting target elements B1 consist principally of blue-emitting phosphor particles 55 of silver-activated zinc sulfide coated with blue-transmitting filter particles 57, as shown in FIG. 4. The phosphor particles 55 [are about 7 to 10 microns average size and] have adhered to their surfaces blue-transmitting filter particles 57 of a cobalt aluminate which are about 0.1 to 0.5 micron average size. [On the average, about 50 percent of the] *The* surfaces of the phosphor particles 55 are *only partially* covered with filter particles 57.

The green-emitting target elements G1 consist principally of green-emitting phosphor particles of copper-activated zinc-cadmium sulfide. In this embodiment, the green-emitting phosphor particles are not coated with filter particles.

The red-emitting target elements R1 are loosely packed layers about 1 to 4 particles thick. When excited, the particles emit red light and possibly other spectral components. The filter particles 53 absorb some of these other spectral components and also some of the red light. The filter particles 53 also absorb spectral components of light from ambient sources. The elements R1 exhibit a light output of about 98 percent and a reflectivity of about 56 percent compared with elements with similar visual color and no light filtering. Less than full surface coverage of the phosphor particles 51[, in the range of 20 percent to 80 percent of the phosphor surface,] permits the optimum amount of ambient light to be absorbed consistent with the transmission of an optimum brightness of emitted red light of greater purity. Examples of other red-emitting phosphors that may be used are manganese-activated zinc orthophosphate, silver-activated zinc-cadmium sulfide, europium-activated yttrium vanadate, and europium-activated yttrium oxide. Examples of other red-transmitting filter materials that may be used are ruby, red-tinted silicate glasses, and red ceramic pigments.

The blue-emitting target elements B1 are loosely packed layers about 1 to 4 particles thick. When excited, the phosphor particles 55 emit blue light and possibly other spectral components. The filter particles 57 absorb some of the light of these other spectral components and some of the blue light. The filter particles 57 also absorb spectral components of light from ambient sources. The elements B1 exhibit a light output of about 94 percent and a reflectivity of about 61 percent compared with elements with similar visual color and no light filtering. Less than full surface coverage[, in the range of about 20 percent to 80 percent] of the phosphor [surface,] *particles* permits the optimum amount of ambient light to be absorbed consistent with the transmission of an optimum brightness of emitted blue light of greater purity. Examples of other blue-emitting phosphors that may be used are titanium-activated calcium-magnesium silicate and terbium-activated yttrium oxysulfide. Examples of other blue-transmitting filter materials are ultramarine, blue-tinted silicate glasses and blue ceramic pigments.

Examples of other green-emitting phosphors that may be used are willemite, manganese-activated zinc aluminate, and silver-activated zinc-cadmium sulfide. Where it is desired to apply a green-transmitting filter material, one may use chromium oxide $Cr_2O_3$ mixtures of yellow cadmium sulfoselenide and blue-green cobalt aluminates, green-tinted silicate glasses and green ceramic pigments.

GENERAL CONSIDERATIONS

The image display includes a viewing screen which may be cathodoluminescent, photoluminescent, electroluminescent or other form of excitation. Furthermore, the display may be a single color or a multicolor display. The elements of the display may be of any shape and size. Where the display is multicolor, one or more of the color element patterns may include the color filter particles.

FIG. 2 illustrates a phosphor layer 31 in which the red-emitting and blue-emitting elements R1 and B1 are principally filter-particle-coated phosphor particles. FIG. 5 illustrates still another phosphor layer 31a which is comprised of a layer of filter-particle-coated phosphor particles R2 and B2 facing the viewing surface and a layer of phosphor particles free of filter particles R3 and B3 on the other side, for the red-emitting and blue-emitting elements respectively. The green-emitting elements G2 do not include filter particles. The double-layer elements shown in FIG. 5 may be produced by two successive applications of phosphor particles. An advantage of the double layers R2-R3 and B2-B3 is that filter particles are absent from the portion of the color elements adjacent the reflecting metal layer 33a, where filter particles are more likely to reduce luminescent brightness and less likely to absorb light from ambient sources.

If desired, the green-emitting elements G1 of FIG. 2 may consist principally of green-emitting phosphor particles partially coated with green-transmitting filter particles. Also, if desired, the green-emitting elements may comprise a double layer (similar to the blue-emitting elements shown in FIG. 5), one layer principally of filter-particle-coated phosphor particles facing the viewer and the other layer of uncoated phosphor particles.

In deciding whether to and how much to coat the phosphor particles, it has to be that the percent decrease in reflectivity of the final elements must be at least twice as large as the percent loss in light output from the element for the same visual color. In the case of the green-emitting elements (such as shown in FIGS. 2 and 5), this specification is difficult but not impossible to comply with for two reasons. First, the human eye sensitivity peaks in the green, and therefore losses in brightness are more noticeable than reductions in reflectivity. Second, at the present stage of development, green-transmitting filter materials generally are not too efficient.

The filter material has a characteristic filtering power. The greater the filtering power, the lower the coverage required on the phosphor particles. Tinted glasses are generally of lower filtering power than inorganic compounds and therefore require a greater coverage of the phosphor particles. In practical systems, the light output should be at least 90 percent of the unfiltered light of the same viaual color. Then, the reflectivity should be as low as possible consistent with this light output.

The filter-particle-coated phosphor particles may be prepared by any convenient process. The process disclosed in U.S. Pat. No. 3,275,466 to R. D. Kell has been found to be a practical process for adhering controlled amounts of filter particles to the surfaces of phosphor particles. That process includes several steps. The phosphor particles, which are about 5 to 20 microns in average size, are coated with an adsorptive film as by immersing the phosphor particles in a solution of gelatin and then washing away any excess gelatin with deionized water. Then, the phosphor particles are agitated in a suspension of filter particles, which are about 0.1 to 0.5 micron average size, in deionized water that is free of adsorptive material. The filter particles cling to the phosphor particles, giving a partial coverage of the surface. The filter particle coated phosphor particles are then washed in deionized water. If the particles are not sufficiently covered, the foregoing steps may be repeated one or more times as desired until the required coverage by filter particles is built up. Then, the filter-particle-coated phosphor particles are dried and are ready for deposit as a phosphor layer. The filter-particle-coated phosphors can be stored as a suspension or as a dry powder.

In order to adjust the percent surface coverage of the phosphor particles, one or more of the following expedients may be used. To increase the coverage, the particles may be coated two or more times. To reduce the coverage, the concentration of filter particles in the suspension thereof may be reduced to produce the desired coverage. Also, after coating and before drying, sonic agitation reduces the coverage by a small amount. Also, adjusting the pH of the filter-particle suspension between 4.0 and 9.0 can adjust the coverage. The higher the pH, the lower the attractive strength of the gelatin-coated phosphor particles.

EXAMPLE 1

A suitable filter-coated red-emitting phosphor material may be prepared by the following procedure. The red-transmitting filter material used is a cadmium sulfoselenide marketed by Harshaw Chemical Co., Cleveland, Ohio, as No. 1550. About 225 grams of the filter material are suspended in 800 milliliters of a 6 weight percent aqueous polyvinyl pyrrolidone solution and milled for ten days in a polyurethane-lined mill with one-half-inch $ZrO_2$ radius end cylinders as the milling media. The resultant filter-particle suspension is diluted with 9 parts by weight of distilled water. To prepare the filter-particle-coated phosphor material, about 225 grams of europium-activated yttrium oxysulfide phosphor are used. The phosphor powder is mixed with about 500 ml of an 0.1 percent gelatin solution. The phosphor powder is allowed to settle, or is centrifuged down, through the gelatin solution, and the supernatent liquid decanted. The settled phosphor is washed three times with about 500 ml distilled water and decanted. The washed phosphor is mixed with 112.5 ml of diluted filter particle suspension and agitated for about 10 minutes. The phosphor particles are permitted to settle until the supernatent liquid is clear. The settled phosphor appears to have a uniform light red body color. The supernatent liquid is decanted, and the settled phosphor is washed twice with distilled water. At this point, [about 40 percent of] the surface of the phosphor particles is *only partially* covered with filter particles. The phosphor particles are dried and may be handled as any other powdered phosphor material for producing a luminescent screen.

EXAMPLE 2

A suitable filter-coated blue-emitting phosphor material may be prepared by the following procedure. The blue-transmitting filter material used is a cobalt aluminate marketed by Harshaw Chemical Company as No. 7546. About 225 grams of the filter material are suspended in 800 ml of a 6 weight percent aqueous solution of polyvinyl pyrrolidone and milled as described above for the red-emitting material, and milled for four days in a polyurethane-lined mill. The resultant filter particle suspension is diluted with nine parts of distilled water. To prepare the filter particle coated phosphor material, about 225 grams of a silver-activated zinc-sulfide phosphor are used. The phosphor powder is mixed with about 500 ml of an 0.1 weight percent gelatin solution and then allowed to settle, and the supernatent liquid decanted. The settled phosphor is washed three times with about 500 ml distilled water and decanted. Then about 295 ml of the diluted suspension is added and agitated for about 10 minutes. The phosphor particles are permitted to settle until the supernatent liquid is clear. The settled phosphor particles appear to have a uniform light blue body color. The supernatant liquid is decanted and the phosphor washed twice with distilled water. At this point, [about 50 percent of] the surface of the phosphor particles is *only partially* covered with filter particles. The coated phosphor particles may be stored as an aqueous suspension, or may be dried, and the dried phosphor may be handled as other phosphor powders for preparing luminescent screens.

EXAMPLE 3

A suitable filter-coated green-emitting phosphor material may be prepared by following the procedure of Example 1 except that the phosphor is a green-emitting copper-activated zinc-cadmium sulfide and the filter material is green-transmitting chromium oxide $Cr_2O_3$.

I claim:

[1. An image display comprising a luminescent viewing screen and means for selectively exciting areas of said screen to luminescence, said screen comprising a layer of phosphor particles emissive of light in a particular portion of the visible spectrum, said phosphor particles having adhered to their surfaces color filter particles which are transmissive of light in said portion of the visible spectrum, said color filter particles covering between 20 and 80 percent of the surfaces of said phosphor particles.]

[2. The display means defined in claim 1 wherein said viewing screen comprises also a second layer of phosphor particles on said layer of filter-particle-coated phosphor particles on the side thereof opposite the viewing side of said screen, said second layer being free of said color filter particles.]

[3. The image display defined in claim 1 consisting essentially of a cathode-ray tube comprising a luminescent viewing screen and means for selectively exciting areas of said screen to luminescence with an electron beam.]

[4. A multicolor display comprising a luminescent viewing screen including at least two interlaced patterns of target elements, each pattern of which emits light of a particular color in the visible spectrum upon excitation, and means for selectively exciting each of said elements to emission, each of the elements of one of said patterns being comprised of a layer of phosphor particles which, upon excitation, emit light of a particular color in the visible spectrum, and color filter particles adhered to the surfaces of said phosphor particles, said color filter particles being transmissive of light of said particular color and being absorptive of light of other colors, and covering between 20 percent and 80 percent of the surfaces of said phosphor particles.]

[5. The multicolor display defined in claim 4 wherein each of said elements of said one pattern is comprised of a layer of red-emitting phosphor particles and red-transmitting color filter particles adhered to the surfaces of said red-emitting phosphor particles.]

[6. The multicolor display defined in claim 4 wherein said phosphor particles are of europium-activated yttrium oxysulfide and said color filter particles are of cadmium sulfo-selenide.]

[7. The multicolor display defined in claim 4 wherein each of said elements of said one pattern is comprised of a layer of blue-emitting phosphor particles and blue-transmitting color filter particles adhered to the surfaces of said blue-emitting phosphor particles.]

[8. The multicolor display defined in claim 7 wherein said phosphor particles are of silver-activated zinc sulfide and said color filter particles cobalt aluminate.]

[9. The multicolor display defined in claim 4 wherein said luminescent viewing screen comprises three interlaced patterns of target elements, one pattern of which is red emitting, one pattern of which is green emitting and one pattern of which is blue emitting.]

[10. The multicolor display defined in claim 9 wherein each of the elements of said red-emitting pattern is comprised of a layer of red-emitting phosphor particles and red-transmitting color filter particles adhered to the surfaces of said red-emitting phosphor particles, and each of the elements of said blue-emitting pattern is comprised of a layer of blue-emitting phosphor particles and blue-transmitting color filter particles adhered to the surfaces of said blue-emitting phosphor particles.]

*11. An image display comprising a luminescent viewing screen and means for selectively exciting areas of said screen to luminescence, said screen comprising a layer of phosphor particles emissive of light in a particular portion of the visible spectrum, said phosphor particles having adhered to their surfaces color filter particles which are transmissive of light in said portion of the visible spectrum, said color filter particles partially covering the surfaces of said phosphor particles, said phosphor particles and said filter particles being present in such proportions that the percent decrease in reflectivity from said layer is at least twice as large as the percent loss in luminescent light output from said layer for the same visual color as compared with a similar layer that is free from filter particles.*

*12. An image display comprising a luminescent viewing screen and means for selectively exciting areas of said screen to luminescence, said screen comprising a layer of phosphor particles emissive of light in a particular portion of the visible spectrum, said phosphor particles having adhered to their surfaces color filter particles which are transmissive of light in said portion of the visible spectrum, said color filter particles partially covering the surfaces of said phosphor particles, said phosphor particles and said filter particles being present in such proportions that the percent decrease in reflectivity from said layer is at least twice as large as the percent loss in luminescent light output from said layer for the same visual color as compared with a similar layer that is free from filter particles, and wherein the luminescent light output from said layer of the same visual color is at least 90 percent of the light outpt of a similar layer that is free from filter particles.*

* * * * *